UNITED STATES PATENT OFFICE.

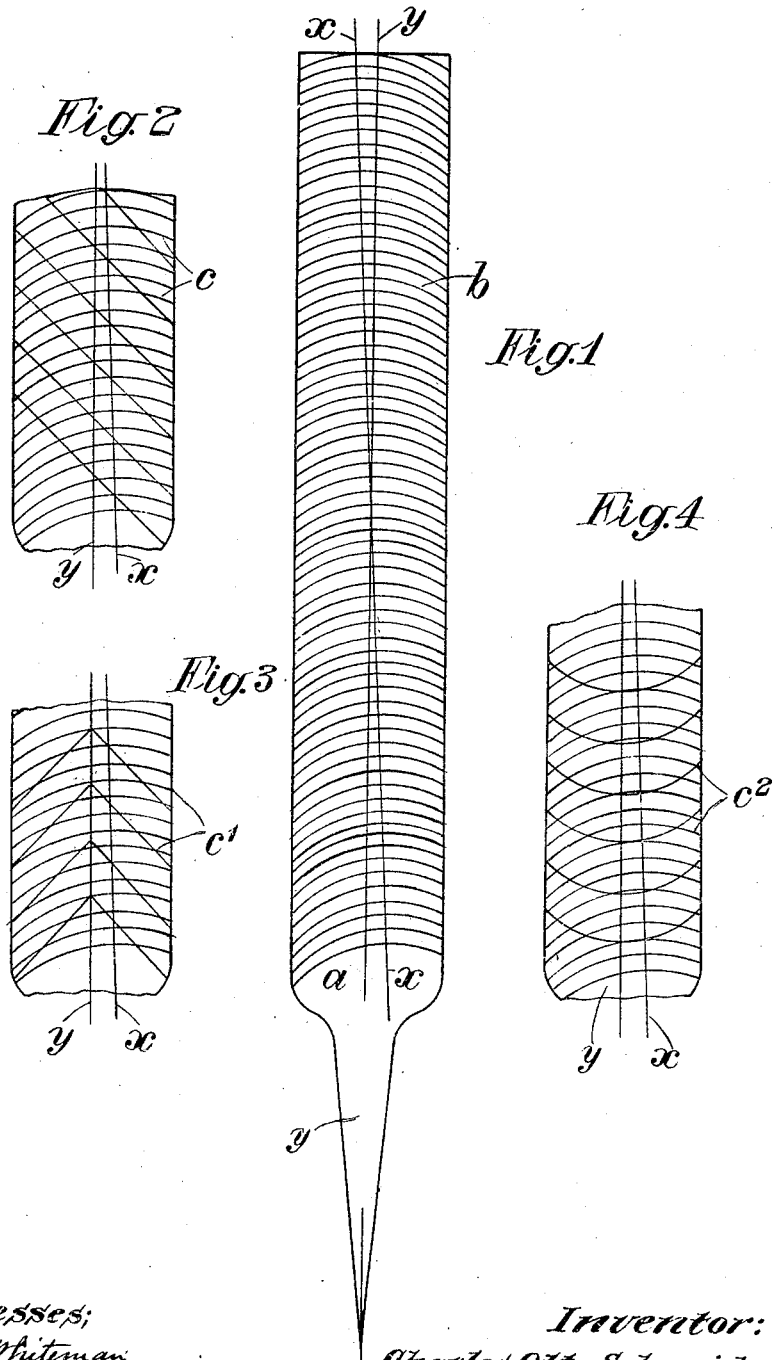

CHARLES OTTO SCHNEIDER, OF WIMBLEDON, LONDON, ENGLAND, ASSIGNOR TO THE PATENT FILE AND TOOL COMPANY LIMITED, OF LONDON, ENGLAND.

FILE.

1,345,890.  Specification of Letters Patent.  Patented July 6, 1920.

Application filed October 14, 1918. Serial No. 258,000.

*To all whom it may concern:*

Be it known that I, CHARLES OTTO SCHNEIDER, a subject of the Emperor of Germany, residing in 73 Cromwell road, Wimbledon, London, S. W. 19, England, have invented certain new and useful Improvements in and Relating to Files, of which the following is a specification.

This invention relates to metal and like cutting files and it refers to files in which the teeth are of arcuate form or are arranged upon arcs of circles extending across the face of the file.

In files of ordinary form it has long been recognized that the effective operation of the file is considerably improved if the angle at which the cutting edges meet the work varies throughout the length of the file, in other words if the file has an increment cut.

The present invention has for its object a file having teeth which are of arcuate outline or teeth arranged upon arcs of circles the centers of which arcs are so disposed with regard to the center line of the file that the angle at which the teeth meet the work is constantly changing, whereby the advantages of an increment cut are secured.

According to this invention instead of the centers of the arcs being located upon the center line of the file they are disposed upon a line inclined with respect to said center line. The line of the centers may be such that it bisects the center line in the middle of the length of the file or at any other point, or it may be disposed upon one side of said center line, and be either wholly contained within the width of the file or be partly or wholly outside thereof.

The teeth may either extend continuously across the face of the file or they may be interrupted by straight diagonal curved or other cuts or channels provided at regular or irregular intervals in the length of the file.

The centers of the arcs may be either behind or in front of the teeth.

In order that the invention may be the better understood drawings are appended in which:—

Figure 1 is a plan showing one form of the invention.

Figs. 2, 3 and 4 are views showing modifications thereof.

Referring to the appended drawings $a$ indicates the body of the file and $b$ the teeth which are of arcuate outline extending uninterruptedly across the face of the file.

The teeth are all arcs of circles of equal radii and the line of the centers of said teeth are disposed upon the line $xx$ which as will be seen is disposed at an angle relatively to the center line $yy$ of the file. By this means the angle at which the teeth meet the work is constantly changing through the stroke of the file.

In Figs. 2 to 4 the teeth are shown as interrupted by means of diagonal cuts or grooves which may be either straight as indicated at $c$ Fig. 2, or of substantially V shaped outline as at $c^1$, Fig. 3 or again said cuts or channels may be of curved outline as shown by $c^2$ in Fig. 4. The cuts or channels may be disposed at regular or irregular intervals along the length of the file.

Claim:

A file having teeth of arcuate form extending across the surface of the file, the generating centers of the arcs of said teeth lying on a line inclined to the axis of said file.

In testimony whereof I affix my signature in the presence of two witnesses.

CHARLES OTTO SCHNEIDER.

Witnesses:
  H. PETER VENN,
  ARTHUR JAMES HALL.